Nov. 11, 1969  C. TOMASINO ET AL  3,477,902
PROCESS FOR MAKING TIRES BY EXPOSURE TO AN IONIZED GAS
AND TREATMENT WITH RESORCINOL-FORMALDEHYDE/LATEX
COMPOSITION AND THE PRODUCT
Filed Oct. 14, 1965
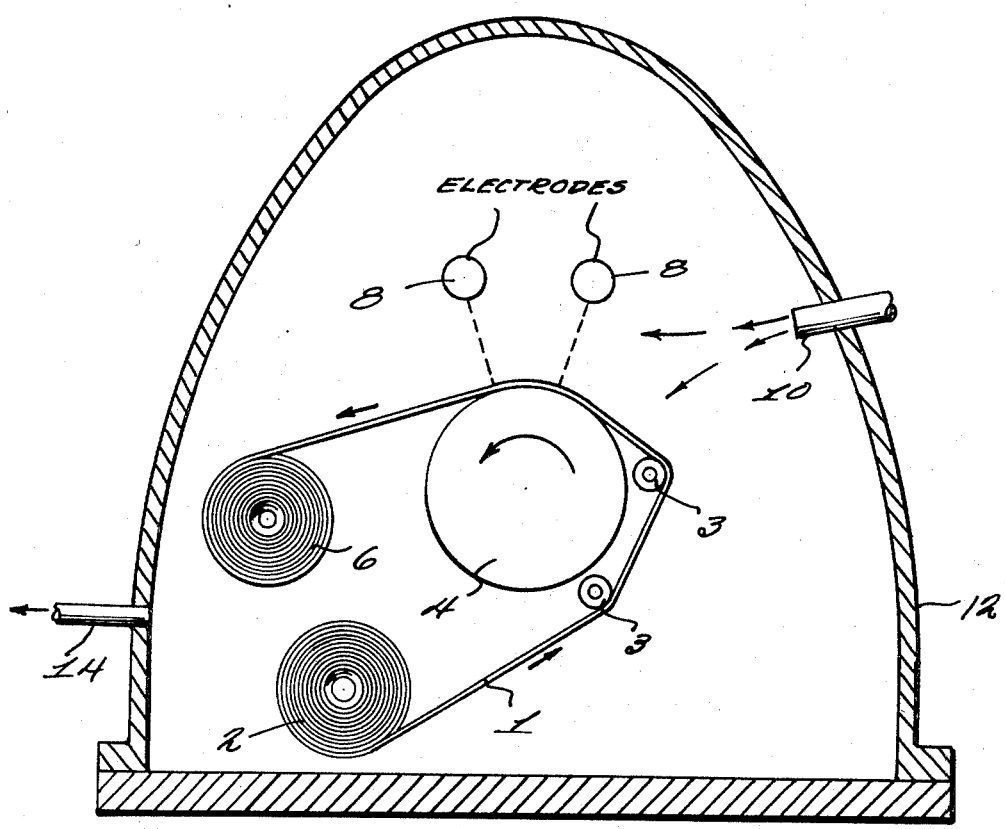
INVENTORS
CHARLES TOMASINO
GERARD K. LAKE
BY
ATTORNEYS United States Patent Office 3,477,902
Patented Nov. 11, 1969

3,477,902
PROCESS FOR MAKING TIRES BY EXPOSURE TO AN IONIZED GAS AND TREATMENT WITH RESORCINOL-FORMALDEHYDE/LATEX COMPOSITION AND THE PRODUCT
Charles Tomasino, Greensboro, N.C., and Gerard K. Lake, New York, N.Y., assignors, by mesne assignments, to Radiation Research Corporation, a corporation of Delaware
Filed Oct. 14, 1965, Ser. No. 495,781
Int. Cl. B32b 25/12
U.S. Cl. 161—241                    5 Claims

ABSTRACT OF THE DISCLOSURE

Process for improving the bonding affinity of material such as textiles and films by which the surface of the material is first modified by exposure to at least one ionized gas and preferably is then treated with a resorcinol-formaldehyde/latex composition.

The present invention relates to the modification of various types of materials for the purpose of improving their bonding properties to other substances.

While the invention is of wide application as will be hereinafter apparent, a particularly important embodiment thereof involves the treatment of synthetic textile materials in order to obtain improved adhesion to polymers such as natural and synthetic rubbers, vinyl resins and the like. Extensive efforts have been directed in the past towards improving the bonding characteristics of such textile materials as rayon, nylon and polyester, to polymeric materials since good adhesion is important in a wide variety of uses, for example, in the manufacture of tires where the fibers are used as tire cord, chafer or the like.

Adhesion between the synthetic textile fibers (as such or in fabric form) is generally promoted by priming the textile material with a so-called "tie coat" which is usually a resole-latex composition (hereinafter referred to for convenience as RFL composition). Numerous prior patents describe RFL compositions used in this manner (see, for example, U.S. Patents 2,961,343, 2,561,215 and Reissue 23,451).

Reasonably good adhesion to rubbers or vinyl resins can be obtained by using known RFL compositions to prime nylon or rayon fibers. However, the adhesion of other synthetic fibers, e.g. polyester, or polypropylene fibers, to rubbers or the like is not significantly improved by using RFL composition as the sole primer. To overcome this problem with respect to polyester fibers, it has been proposed to first prime the fibers with an isocyanate after which the resole/latex composition is applied (see, for example, the copending U.S. applications of Everett C. Atwell, Ser. No. 68,145, No. 70,917, and No. 70,428 granted respectively as Patents No. 3,240,659, No. 3,240,650 and No. 3,240,649).

The dual primer system involving isocyanate application followed by resole/latex composition brings about a significant improvement in the adhesion of polyester fibers to rubbers. However, it is still considered desirable to have an alternative route which is free from isocyanate, particularly since the use of isocyanate requires extreme care. Normally, the isocyanate is applied from a water-free organic solvent solution but it is preferred to avoid organic solvents wherever possible in the processing of textile materials. Furthermore, none of the prior known bonding systems, including the above described dual primer systems, appears to be effective towards rendering polypropylene fibers sufficiently adhesive for satisfactory lamination to rubbers, vinyl resins and other polymers.

There is also a need for improvement in the bonding of other textiles, such as glass fibers, to various types of materials and even in the case of nylon and rayon fibers there is still considerable room for improvement towards obtaining optimum adhesion at minimum cost. Additionally, there are other areas, such as in the bonding of synthetic polymer films to each other or to other substances, where there is a need for a better overall bonding effect.

In view of the above, the principal object of the invention is to provide a novel process for improving the bonding charactertics of textiles and other materials, particularly those which have previously been difficult to bond, such as polyesters, polypropylene and glass.

A more specific object of the invention is the provision of a process for modifying the properties of synthetic fibers and other shaped articles whereby they may be more effectively bonded to such materials as rubbers, vinyl resins and other polymers.

A further object of the invention is to provide textiles and other materials which have been so modified that they may be advantageously and effectively bonded to substances where bonding is normally difficult.

Other objects will also be apparent from the following detailed description of the invention.

According to one aspect of the invention, the above objects are realized by modifying the surface of the textile or other material by exposure to an activated or ionized gaseous atmosphere followed by application of RFL composition. In another embodiment, the invention contemplates subjecting the material to successive exposures using different activated gaseous atmospheres with or without a subsequent application of RFL composition or some other type of coating or treating agent.

The success of the invention is due, in large measure, to the finding that subjecting the material to be bonded to an ionizing discharge, preferably but not necessarily glow discharge, results in some sort of surface modification which, when followed by a repeated exposure to the discharge in a different gaseous atmosphere and/or application of the RFL composition, gives the material unexpectedly improved bonding characteristics. The exact manner in which the process of the present invention functions to give the improved bonding effect described herein is not understood, particularly since adhesions obtained using, for example, material which has been processed according to the invention by a combination of the discharge treatment and RFL application are very substantially greater than the additive effects for the steps individually. Apparently, this synergistic effect is due to a surface modification of the textile or other material during the discharge treatment, possibly through grafting and/or other reaction between gaseous ions in the ionized or activated atmosphere, and the material being treated, which in some way makes the material much more receptive to the RFL composition subsequently applied thereto.

The discharge used herein may be any of the known high- or low-energy types, e.g. electron beam, corona discharge, arc, microwave, hot wire, positive column and electrodeless. However, it is preferred to carry out this step of the process using the glow discharge technique. This type of electric discharge is well known in the art and is described in, for example, U.S. Patents, 3,057,792, 3,069,283, 3,068,510 and 2,932,591.

As noted, modification of the textile or other material by discharge according to the invention should be carried out in the presence of an activated gaseous medium. Broadly stated, this gaseous medium may be any vaporizable compound or material which has sufficient vapor pressure at the operating conditions to sustain the desired ionizing discharge. The medium selected should also be one which will ionize and react with and/or otherwise modify the surface of the material being treated under the discharge condition. This includes vaporizable compounds which have the basic groups (—$NH_2$ or —OH), acid groups (—COOH) or the like. Vaporizable monomers as contemplated and described in the above-mentioned U.S. Patents 3,069,283, 3,068,510 and 2,932,591 may be used. Advantageous results are obtained using nitrogen, oxygen or combinations such as air, $H_2O$, $NH_3$ or $CF_3COOH$ as illustrated below. Other specific materials which can be used to provide the gaseous activated medium include argon, helium, sulphur dioxide, chlorine, hydrogen, $NO_2$, formaldehyde, methanol, amines, ethyl acrylate, styrene, acrylonitrile, vinylidene chloride, dicyclopentadiene and the like as exemplified below.

Particularly advantageous results are obtained if the textile or other material to be modified is subjected to two or more successive ionizing discharges using a different activated gaseous medium for each such discharge. Especially preferred for this type of operation according to the invention is a first ionizing discharge treatment using oxygen or other free-oxygen containing gas followed by a second discharge treatment where the gaseous atmosphere is nitrogen, water vapor or ammonia. The material resulting from this dual discharge treatment is uniquely adapted for bonding to other materials. In this particular instance, i.e. where the textile or the like has been subjected to two or more discharge treatments with different gases, the RFL composition may be replaced by other bonding media, e.g. epoxides, rubber applications, etc. In one particularly useful application of this embodiment of the invention, gray goods may be subjected to discharge treatment in the presence of oxygen (as such or in the form of air or mixture with other gases) followed by a second discharge treatment using nitrogen, water vapor, or ammonia as the gaseous medium. The discharge in the presence of oxygen apparently obviates the necessity for scouring and offers the advantage of a dry processing operation which fits nicely into the subsequent operations.

It will be recognized that such conditions as current density, pressure, voltage and temperature, used for the discharge treatment will vary depending on the type of discharge employed. Optimum operating conditions are known in the art for the various types of discharge and these may be used herein. For example, when glow discharge is employed, the pressure would usually be in the range of 0.1 to 10 mm. mercury with a voltage of about 200–1000 volts. Frequencies of up to 40–60 kc. or even higher may be used but from the practical standpoint, the frequency preferably falls in the range of 3–10 kc. The temperature of the material being treated and the time of treatment can be widely varied, depending on practical considerations and other conditions. However, for purposes of illustration, it may be noted that the temperature can be in the range of —50° C. or lower, up to any temperature below the point where the material is damaged and the time for each discharge treatment may be from a fraction of a second duration up to one minute or even higher, such as five to ten minutes. The current density may likewise be varied over a wide range with current densities of less than 10 milliamps per square inch down to about 0.5 milliamps per square inch representative.

As noted, the manner in which the textile or other material is modified during the discharge treatment is not fully understood. When a material such as nitrogen or ammonia is used as the activated gaseous medium, it does not appear that a coating is formed on the excited material. However, some sort of surface modification is noted in that, for example, the treated material appears to wet more rapidly than the untreated. Also, the fibers treated with trifluoroacetic acid or $SO_2$ stain with basic dyes (indicating that acid groups are available) while ammonia treated fibers stain with wool dyes (indicating the presence of $NH_2$ groups).

After modification of the textile or other material as aforesaid, the RFL composition is applied at any desired stage, i.e. immediately after the discharge treatment or after storage. For present purposes, any type of RFL composition may be used. Typically useful RFL compositions are shown in the abovementioned U.S. Patents 2,561,215 (Reissue 23,451) and 2,961,343. Other useful RFL compositions are shown in the abovementioned applications of Atwell Ser. Nos. 68,145, 70,917, and 70,428. The preferred resole/latex composition used herein is one wherein the latex is in whole or part vinylpyridine-butadiene-styrene terpolymer latex.

The RFL application usually includes one or more passes of the material through the RFL composition followed by drying after each pass and preferably but not necessarily curing after the last pass. The material is then ready to be bonded to whatever material may be desired.

The discharge and RFL application of the invention may be applied to a wide variety of natural, man-made or synthetic materials. As representative, there may be mentioned the homopolymers and copolymers of perfluorocarbons, vinyl fluoride, vinyl chloride, vinyl acetate, vinylidene fluoride and vinylidene chloride; the polyolefins such as polyethylene, polypropylene, and polybutene-1; polystyrene; linear polyesters such as polyethylene terephthalate; polyamides; acrylonitrile polymers; acrylate and methacrylate polymers; polycarbonates; polyurethanes; cellulose ethers; cellulose acetate; natural and regenerated cellulosics; epoxy resins; aldehyde resins, wool and other proteins, and glass.

The material treated as described herein may be in any desired shape. Thus, for example, the invention is applicable to the treatment of films, supported and unsupported, and expanded structures such as foams. Preferably, however, the invention is applied to synthetic textile fibers (the latter being intended to embrace textiles generally, i.e., fabrics as well as non-fabricated forms of fibers such as yarns, filaments, etc.). While all types of synthetic textile fibers may be processed as described, application of the invention to those fibers which have been especially difficult to effectively bond using prior techniques, e.g. polyesters, polypropylene and glass, is of particular importance.

Textile fibers, films or other materials as processed herein may be readily and effectively bonded to a variety of polymers or other materials. This includes, for example, all types of rubbers and such vinyl resins as polyvinyl chloride or vinyl chloride/vinyl acetate copolymers. Vulcanizable natural rubber or synthetic rubber compositions such as butadiene-styrene, butadiene-acrylonitrile and neoprene rubber compositions, e.g. conventional hose or tire stock, may be mentioned as specific illustrations of materials effectively bonded to the fibers or other materials processed according to the invention. Typically, such rubber compositions may have the following representative makeup:

| | Parts |
|---|---|
| Smoked sheet rubber or GR-S | 100 |
| Zinc oxide | 5–20 |
| Sulfur | 2–3 |
| Stearic acid | 1 |
| Accelerator | 1–2 |

The rubber, vinyl resin or other polymer may be bonded to the treated material in conventional fashion. Thus, for example, natural rubber compounded in sheet form, typically ordinary hose stock or tire stock, may be pressed against polyester fibers which have been processed according to the invention, the resulting laminate being vulcanized under conventional conditions (e.g. 290° F. to 300° F. and desirably 125 to 250 p.s.i. pressure for 30 to 45 minutes). This gives a rubber/textile laminate of exceptional bond strength.

The invention is illustrated, but not limited, by the following examples wherein parts and percentages are by weight unless otherwise stated.

EXAMPLE I

A 12″ x 20′ sample of Dacron polyester fabric was exposed to an electric discharge (glow) in trifluoroacetic acid. The operating conditions were:

Frequency _____ kc__ 40
Pressure _____ 1,000µ
Voltage _____ v__ 380
3 electrodes each at 60 milliamps.
Fiber exposure at 40′/hr.

No visible coating was noted on either the metal electrode supporting the fabric or the fabric itself. Untreated, as well as treated samples were tested for adhesion to rubber. One piece of treated fabric and a piece of untreated fabric were dipped in RFL composition and thereafter bonded to rubber while a second piece of each fabric was laminated to rubber without RFL application. The results are set forth below:

|  | Adhesion to Rubber (3-layer product) | |
| --- | --- | --- |
|  | Dry | Wet |
| Control (no glow, no RFL) | 4.0 P/I | 5.0 P/I |
| Control (no glow, two RFL dips) | 9.0 P/I | 5.3 P/I |
| Electric Discharge—No RFL | 3.0 P/I |  |
| Electric Discharge—Two coats RFL | 22.0 P/I | 17 P/I |

P/I in the above table represents pounds per square inch needed to separate the colth from the rubber using the standard peel test, the test jaws being separated at the rate of 2″ per minute. Wet adhesion was obtained after soaking the laminate in water. The reference to "3 layer" above means that the laminate subject to test comprised three layers, i.e. two outer fabric layer bonded to an intermediate rubber layer. The 40′/hour fabric exposure to glow discharge used herein was equivalent to a treatment time of ten seconds.

EXAMPLE II

Dacron fabric was treated in the same manner as Example I. The glow discharge was carried out in NH₃ vapor under the following conditions:

Frequency _____ kc__ 40
Pressure _____ 1,000µ
Voltage _____ v__ 320
Fabric speed _____ 40′/hr.
3 electrodes each at 60 milliamps.

Results: Controls same as Example I.

|  | Adhesion to Rubber | | | |
| --- | --- | --- | --- | --- |
|  | 3 layer | | 5 layer | |
|  | Dry | Wet | Dry | Wet |
| A. Electric Discharge in NH₃—No RFL. | 4.0 P/I | 5.0 P/I |  |  |
| B. Electric Discharge—2 dips in RFL. | (Cloth Broke) |  | 32–42 P/I [1] | 35 P/I [2] |

[1] Partial stock failure.
[2] Stock failure.

The 3 layer laminate referred to in this example had the same construction as the laminate in Example I. The 5 layer laminate included another layer of rubber followed by a layer of the fabric bonded to the basic 3 layer laminate.

The above references to stock failure or partial stock failure indicate that the rubber stock failed or started to fail before the bond was disrupted. This shows maximum adhesion as does the fact that the cloth broke on the 3 layer test.

Example III

Electric discharge was conducted in water vapor using Dacron fabric as in Example I. Run conditions:

Frequency _____ kc__ 50
Pressure _____ 5,000µ
Voltage _____ v__ 350
3 electrode 30/65/65 milliamps.

Results:

|  | Adhesion to Rubber | | | |
| --- | --- | --- | --- | --- |
|  | 3 layer | | 5 layer | |
|  | Dry | Wet | Dry | Wet |
| A. Electric Discharge in H₂O—No RFL. | 5.0 P/I | 5.2 P/I |  |  |
| B. Electric Discharge—2 coats RFL. | (Cloth broke) |  | 40 P/I+ [1] | 46 P/I [1] |

[1] Stock failure.

EXAMPLE IV

The procedure of Example I was repeated with the variations shown below using a polypropylene fabric comprising 38 ends and 20 picks per inch of 10's/2 ply polypropylene yarn (13 turns Z singles, 10 turns S in 2 ply, 3 denier x 1½ inch staple length). The following results were obtained:

| Fabric Condition | Activated Gas | Glow Exposure | RFL Type 2 passes | Adhesion | |
| --- | --- | --- | --- | --- | --- |
|  |  |  |  | Dry | Wet |
| Scoured | None | None | 100% Gentac | 11.6 | 12.0 |
| Do | do | do | 80% SBR, 20% Gentac | 12.7 | 12.5 |
| Do | NH₃ (both sides of fabric) | 0.5 f.p.m. | 100% Gentac | 19.5 | 19.8 |
| Do | do | 0.5 f.p.m. | 80% SBR, 20% Gentac | 17.0 | 17.3 |
| Do | H₂O (both sides of fabric) | 0.5 f.p.m. | 100% Gentac | 16 | 17.5 |

The 0.5 f.p.m. (feet per minute) exposure time was equivalent to ten seconds glow treatment. The Gentac referred to under "RFL Type" is a commercially available vinylpyridine-styrene-butadiene terpolymer latex while "SBR" stands for a styrene-butadiene rubber latex.

The reference to "100% Gentac" means that the latex component of the RFL was all vinylpyridine-styrene-butadiene terpolymer latex. This type RFL composition was used in Examples I–III and where indicated in the present Example IV. The reference above to 80% SBR, 20% Gentac means that the latex component of the RFL composition was 80% styrene-butadiene copolymer latex, balance "Gentac."

As will be apparent from the data tabulated above, the adhesions obtained using the glow treatment with ammonia gas or water vapor followed by RFL application are 50–75% greater than those obtainable using either of the RFL compositions.

EXAMPLE V

This example shows the results obtained on a scoured polyester chafer fabric (20 ends x 20 picks per inch, 1100 denier, 300 filament, 5 turns, type 8 Vycron Z polyester) using the process as described in Example I except for the indicated variations:

| Fabric | Activated Gas | Glow Exposure | RFL Type (2 passes) | Adhesion Dry | Adhesion Wet |
|---|---|---|---|---|---|
| Scoured chafer | None | None | 100% Gentac | 12 | 11 |
| Do | NH₃ (2 sides) | 0.5 f.p.m | 100% Gentac | [1]49 | [1]46 |
| Do | do | 0.5 f.p.m | 80% SBR, 20% Gentac | [2]53 | [2]43 |
| Do | H₂O | 0.5 f.p.m | 100% Gentac | [2]57 | [2]60 |
| Do | H₂O | 0.5 f.p.m | 80% SBR, 20% Gentac | [2]56 | [2]40 |
| Do | NH₃ (2 sides) | 21 f.p.m | 100% Gentac | [2]77 | [2]79 |
| Do | Cl₂ | 0.5 f.p.m | do | 25 | |
| Do | Cl₂ followed by NH₃ | 0.5 f.p.m | do | 34 | |
| Do | SO₂ | 0.5 f.p.m | do | 34.5 | |
| Do | SO₂ followed by NH₃ | 0.5 f.p.m | do | [1]42 | |
| Do | O₂ | 0.5 f.p.m | do | 33 | |
| Do | O₂ followed by NH₃ | 0.5 f.p.m | do | [1]55 | |
| Do | CF₃COOH | 0.5 f.p.m | do | 33 | |

[1] Partial stock failures.
[2] Stock failure.

While NH₃ and H₂O vapor gave the best adhesions, it is to be noted that use of the glow with any of the indicated activated gases resulted in significantly improved adhesions.

EXAMPLE VI

Example V was repeated except that, in this instance, the polyester chafer fabric was processed in the gray state. The results were as follows:

| Fabric | Activated Gas | Glow Exposure | RFL Type (2 passes) | Adhesion P/I Dry | Adhesion P/I Wet |
|---|---|---|---|---|---|
| Gray chafer | None | None | 100% Gentac | 14 | 12 |
| Do | NH₃ | 0.5 f.p.m | do | 25.8 | 19.5 |
| Do | H₂O | 0.5 f.p.m | do | 28 | 15 |
| Do | O₂ followed by NH₃ | 0.5 f.p.m | do | [1]74 | 41 |
| Do | He followed by NH₃ | 0.5 f.p.m | do | 20 | 15 |
| Do | H₂ followed by NH₃ | 0.5 f.p.m | do | 33 | 20 |
| Do | Cl₂ followed by NH₃ | 0.5 f.p.m | do | 34 | 25 |

[1] Stock failure.

The bonding of fabric in the gray state is difficult but it is to be noted that substantial improvement in adhesion is obtained using the present process. The best results are shown in the above when the fabric is subjected to an initial glow treatment of "scour" with oxygen followed by glow treatment with ammonia gas and the RFL applications. As noted earlier, this type of "preglow" operation, involving sequential glow treatment with different gases, particularly when oxygen is used in the first discharge and nitrogen, water vapor or ammonia, is subsequently employed, represents a preferred embodiment of the invention.

EXAMPLE VII

The process of Example V was repeated using other different activated gases on the scoured polyester chafer with the following comparative adhesion results:

EXAMPLE VII

| Fabric | Activated Gas | Exposure | RFL Type | Adhesion Dry | Adhesion Wet |
|---|---|---|---|---|---|
| Scoured chafer | None | | 100% Gentac | 15 | 13.5 |
| Do | Methanol | 0.5 f.p.m | do | 38.5 | 26 |
| Do | Anhydrous Formaldehyde | 0.5 f.p.m | do | [1]55 | 22 |
| Do | (37% Formalin) Formaldehyde | 0.5 f.p.m | do | [1]68 | [1]49 |
| Do | 37% Formalin followed by Ethylene Diamine | 0.5 f.p.m | do | [1]66 | [1]50 |
| Do | Methanol followed by Ethylene Diamine | 0.5 f.p.m | do | 57 | 35 |
| Do | Acrylonitrile | 0.5 f.p.m | do | 32 | 14 |
| Do | Monomethyl Amine | 0.5 f.p.m | do | 43 | 27 |
| Do | Ethylene Diamine | 0.5 f.p.m | do | 31 | 17 |

[1] Partial stock failure.

The presence of some water vapor in the activated gas appears to improve the adhesion results (compare, for example, the results obtained using anhydrous formaldehyde on the one hand and 37% Formalin on the other).

EXAMPLE VIII

The following adhesion results to rubber were obtained with a heat cleaned fiber glass fabric using the conditions of Example I unless otherwise indicated:

| Activated Gas | Exposure | RFL Type | Adhesion Dry | Adhesion Wet |
|---|---|---|---|---|
| None | None | None | 1 | 1 |
| Do | do | 100% Gentac | [1]75 | 18 |
| Ethylene Diamine | 0.5 f.p.m | None | 1 | 1 |
| Do | 0.5 f.p.m | 100% Gentac | [1]80 | [1]70 |

[1] Stock failure.

The improvement in adhesion, particularly wet adhesion, obtained by using ethylene diamine as the glow gas and 100% Gentac as the RFL is readily apparent from the foregoing.

EXAMPLE IX

This example summarizes adhesion results obtained by subjecting Mylar polyester film (1 mil thickness) to the treatment of the present invention and then bonding to rubber using essentially the conditions of Example I except where otherwise indicated:

| Treatment | Activated Gas | Exposure | RFL Type | Rubber Adhesion (lbs.) |
|---|---|---|---|---|
| None | None | | None | >0.01 |
| Do | do | | 100% Gentac | >0.02 |
| Glow discharge | $O_2$ | 0.5 f.p.m | do | 0.5 |
| Do | Air | 0.5 f.p.m | do | 1.0 |
| Do | Argon | 0.5 f.p.m | do | 2.5 |
| Do | Acrylonitrile | 0.5 f.p.m | do | 1.5 |
| Do | $N_2$ | 0.5 f.p.m | do | 6.0 |
| Do | $H_2O$ | 0.5 f.p.m | do | 3.5 |
| Do | $NH_3$ | 0.5 f.p.m | do | 5 |
| Do | $SO_2+Cl_2$ | 0.5 f.p.m | do | 2.5 |
| Do | $SO_2+H_2O$ | 0.5 f.p.m | do | 7 |
| Do | $SO_2+Cl_2+H_2O$ | 0.5 f.p.m | do | 6.5 |
| Do | Dicyclopentadiene | 0.5 f.p.m | do | 8.0 |
| Do | do | 0.5 f.p.m | None | 2.0 |
| Do | Vinylidene Chloride | 0.5 f.p.m | do | 2.0 |

The 100% Gentac RFL composition used in the above examples can be prepared according to Example II of Ser. No. 70,917, the subject matter of which is incorporated herein by reference. The RFL composition containing both Gentac and SBR was obtained by simply substituting the indicated amount of styrene-butadiene latex for the corresponding amount of Gentac.

The application of the RFL composition in each of the above examples was carried out as follows immediately after the indicated glow discharge treatment was completed:

The fabric was run through the RFL composition and then passed through pad squeeze rolls. This was done once or twice, where so indicated, to get the desired solids add-on (usually around 12–15% by weight of the fabric). The fabric was dried at 220° F. after each passage through the squeeze rolls. The dried material was then preferably subjected to a final cure of 5 minutes at 320° F. to remove all traces of moisture and to fully polymerize and cross link the resin/latex solids. The fabric was then bonded to conventionally compounded natural rubber (Goodyear) sheet (tire stock .040 inch thick) by placing the sheet between two pieces of the treated fabric followed by vulcanizing at 290° F. for 30 minutes. The 5-layer laminate referred to in Examples II and III was prepared by adding another sheet of rubber and piece of fabric to the 3-layer laminate followed by vulcanizing. Essentially the same conditions were used in Example IX except that, in this instance, only a single layer of the polyester film was bonded to the rubber.

The accompanying drawing schematically shows in cross section apparatus used in carrying out the examples given above. As shown, the material 1 to be bonded, e.g. fabric or film, is taken off a supply roll 2 and fed around idler rolls 3 and then over a large cylindrical electrode 4. Means not shown are provided for driving electrode 4, the supply roll 2 and/or the takeup roll 6. Further means (also not shown) are operatively associated with electrode 4 and the upper smaller cylindrical electrodes 8 for the purpose of providing the desired discharge therebetween as known in the art (see, e.g. the abovementioned 3,069,283, 3,068,510 and 2,932,591). The gas to be activated is fed through inlet 10 into the sealed treating vessel 12 and between electrode 4 and the upper electrodes 8. If desired, the gas inlet may actually discharge through one of the electrodes in the space or gap between the top and bottom electrodes. The desired pressure in vessel 12 is obtained by exhaust means 14 and suitable evacuating means associated therewith (not shown).

Obviously, various modifications may be made in the invention described herein. Hence, the scope of the invention is defined in the following claims wherein.

We claim:
1. In a process for making tires made up of textile material bonded to rubber, the steps of modifying the surface of the textile material by exposure to an ionized gaseous atmosphere in an electric discharge, then treating said textile material with a resorcinol-formaldehyde/latex composition in the absence of an isocyanate primer, and thereafter bonding the treated textile material to rubber.

2. The process of claim 1 wherein said textile material comprises a material selected from the group consisting of polyester material, polypropylene material and glass fibers.

3. The process of claim 1 wherein said ionized gas is selected from the group consisting of oxygen, water vapor, ammonia, air, hydrogen, argon and helium.

4. The process of claim 1 wherein said textile material comprises glass fibers and said ionized gas is ethylene diamine.

5. A tire comprising a textile material bonded to rubber and produced by the process of claim 1.

References Cited

UNITED STATES PATENTS 2,876,185  3/1959  Wolinski.
3,111,424  11/1963  Le Clair.
3,255,099  6/1966  Wolinski.

DOUGLAS J. DRUMMOND, Primary Examiner

U.S. Cl. X.R.

117—93.1; 156—272; 161—412